United States Patent [19]

Chiu

[11] Patent Number: 5,180,184
[45] Date of Patent: Jan. 19, 1993

[54] COLLAPSIBLE THREE-STAGE GOLF CART

[75] Inventor: Hsiu-Hui Chiu, Tainan Hsien, Taiwan

[73] Assignee: Sunshon Molding Co., Ltd., Tainan Hsien, Taiwan

[21] Appl. No.: 828,495

[22] Filed: Jan. 31, 1992

[51] Int. Cl.⁵ .............................................. B62B 1/04
[52] U.S. Cl. ............................. 280/646; 280/DIG. 6; 248/96
[58] Field of Search ................ 280/645, 646, 42, 652, 280/654, 655, 47.24, 47.26, 47.33, DIG. 6; 403/104; 248/96

[56] References Cited

U.S. PATENT DOCUMENTS

| | | | |
|---|---|---|---|
| 4,455,030 | 6/1984 | Rosen | 280/DIG. 6 X |
| 4,887,835 | 12/1989 | Dallaire et al. | 280/DIG. 6 X |
| 4,913,460 | 4/1990 | Klein | 248/96 X |
| 4,936,598 | 6/1990 | Lee | 248/96 X |
| 5,106,117 | 4/1992 | Wang | 280/646 |

FOREIGN PATENT DOCUMENTS

| | | | |
|---|---|---|---|
| 776533 | 1/1968 | Canada | 248/96 |
| 3423458 | 6/1985 | Fed. Rep. of Germany | 280/DIG. 6 |
| 1172525 | 12/1969 | United Kingdom | 280/646 |

Primary Examiner—Brian Johnson
Attorney, Agent, or Firm—Morton J. Rosenberg; David I. Klein

[57] ABSTRACT

A collapsible or foldable three-stage golf cart is provided having three-stage frames foldably connected by joint members. A collapsible wheel mechanism may be spread or unfolded to allow wheels to interface with the ground for using this golf cart. Alternatively, the golf cart may be folded in a manner that the wheel mechanism is folded adjacent the three-stage frames to minimize the volume dimension of the golf cart when it is to be stored or transported. A foldable club bag holder is further provided to hold the upper portion of a golf bag when the golf cart is unfolded or to be folded to a position adjacent the stage frame members for storage purposes.

2 Claims, 7 Drawing Sheets

COLLAPSIBLE THREE-STAGE GOLF CART

BACKGROUND OF THE INVENTION

This invention relates to a collapsible golf cart for transporting golf clubs and is structured to permit removal of a golf club bag after the golf club cart has been folded or collapsed to a non-use position.

SUMMARY OF THE INVENTION

The collapsible three-stage golf cart according to the subject invention concept has been devised to provide (1) a collapsible or foldable wheel mechanism which allows extension of the wheels for use and further to foldably collapse the wheels for minimizing overall cart dimensions for storage purposes or transportation of the golf cart, and (2) a golf bag strap fixedly attached to the frame placed in a folded position for holding the upper portion of the golf bag in order that the clubs inserted therein can be stabilized or alternatively, such may be folded to lie in a lengthwise position adjacent an intermediate frame to minimize its dimensional size. As described, the subject dimensional sized golf cart has a number of advantages including:

1. The collapsible or foldable wheel system has a simplified structure which lowers the capital and labor costs in manufacture;
2. The collapsible or foldable wheel system may be opened or spread for operational use or collapsibly positioned for storage;
3. The collapsible or foldable wheel system provides a stabilization platform when spread out for use, and may be displaced in a smooth continuous manner for operational placement;
4. The collapsible wheel system minimizes volumetric dimensions when in the collapsed condition or position;
5. The club strap is structurally secure to allow clubs placed in the club bag to be stabilized and can be folded to lie adjacent an intermediate frame to minimize its dimensions when the golf cart is not in use; and,
6. The golf cart may be collapsed to a conditional position of minimal dimensions for transportation or to a collapsed position for placement in the truck of a car without removal of the club bag.

DETAILED DESCRIPTION OF THE PREFERRED EMBODIMENTS

Figure 1:
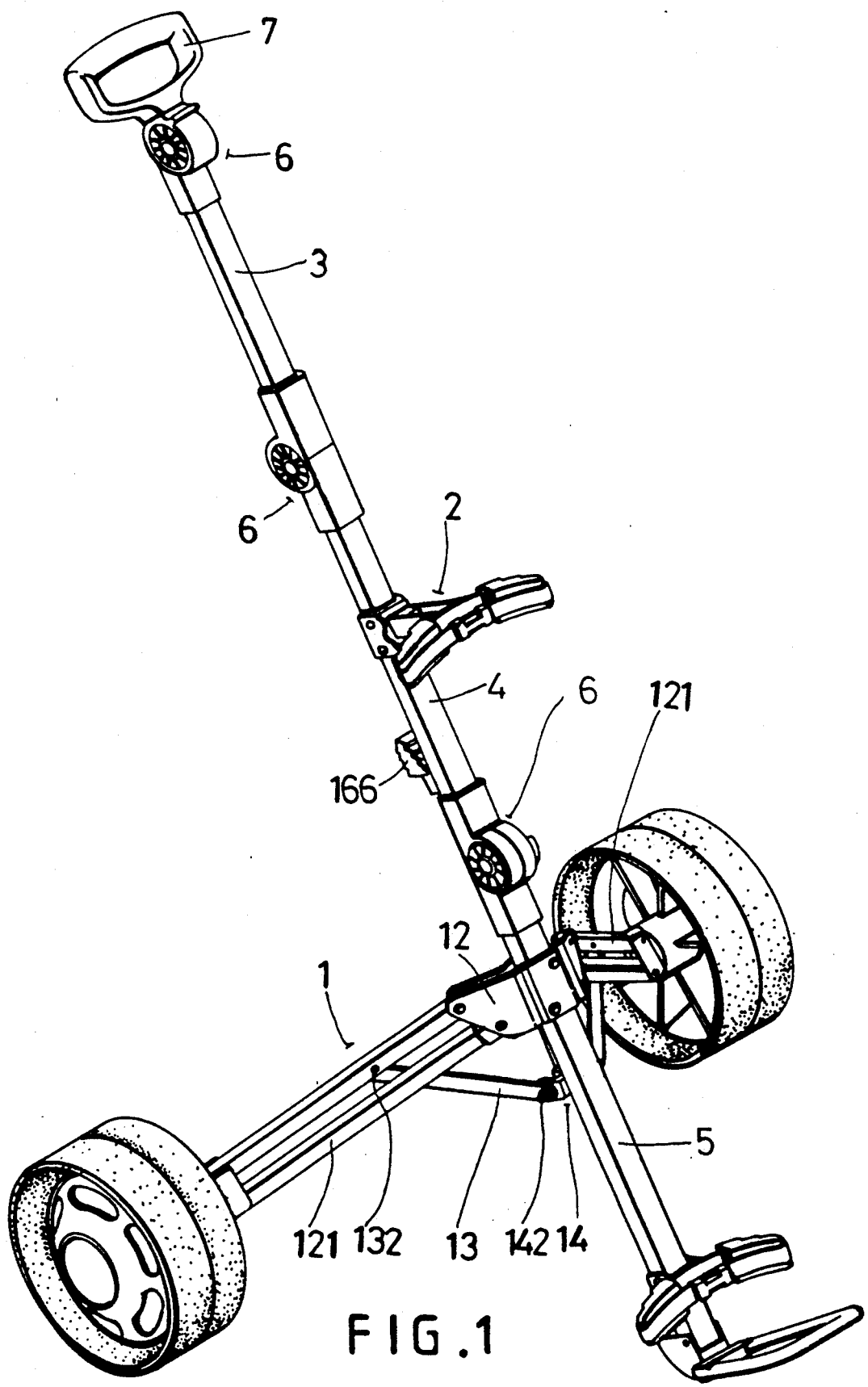
FIG. 1 is a perspective view of the collapsed three-stage golf cart of the present invention.

The collapsible or foldable three-stage golf cart of the present invention is shown in FIG. 1 and comprises an upper frame 3, an intermediate frame 4, a lower frame 5, three joint members 6 which join the three frame members 3, 4, and 5 together. A grip handle 7 is provided with a collapsible wheel mechanism 1 and a club strap 2 defining the main operational components of the three-stage golf cart.

Figure 2:
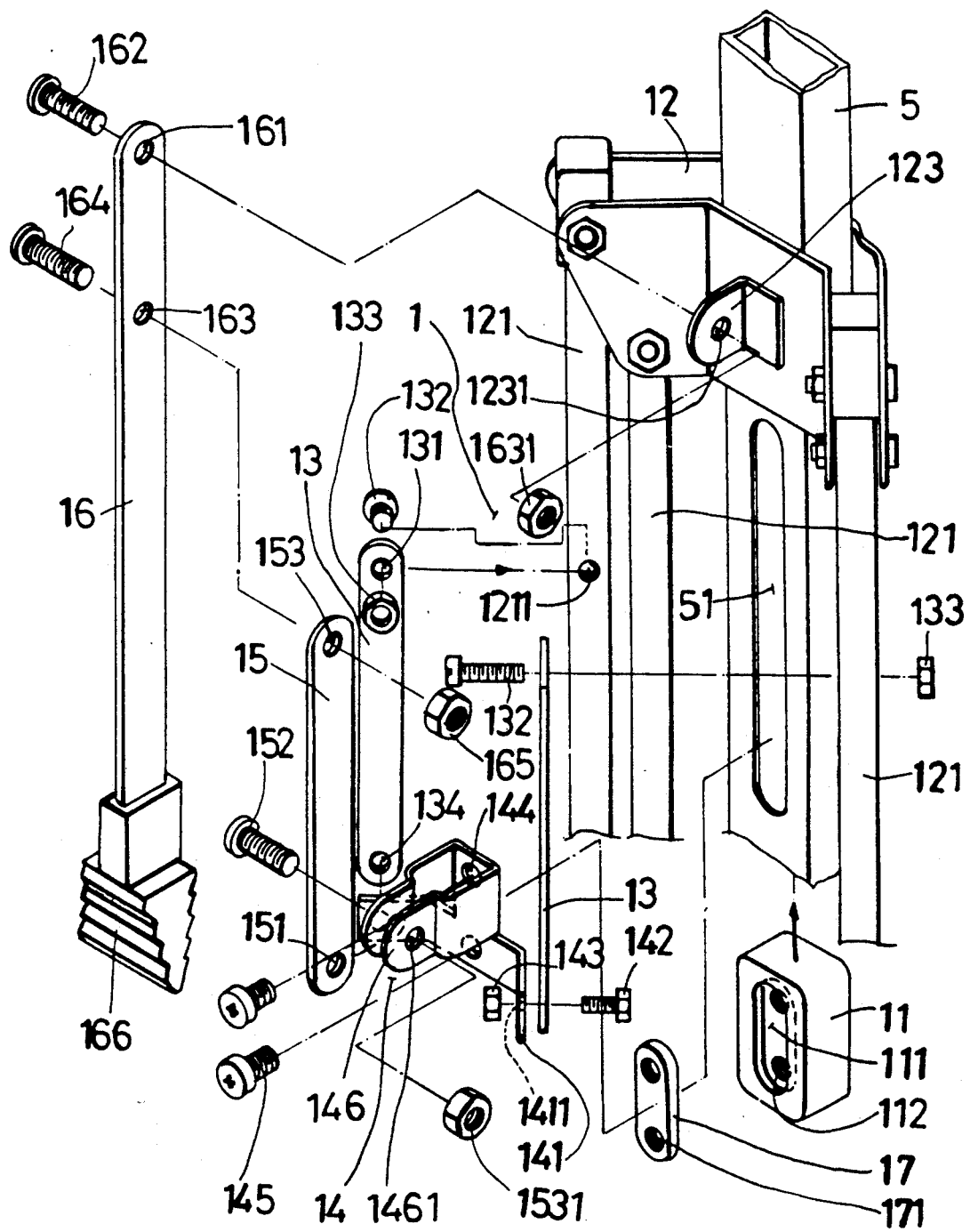
FIG. 2 is an exploded perspective view of the collapsible wheel mechanism in the collapsible three-stage golf cart.

As shown in FIG. 2, the lower frame 5 includes a hollow tube of substantially rectangular cross-section having an elongate opening 51 formed in one side and further defines a hollow longitudinally directed cavity passing therethrough.

The collapsible or foldable wheel mechanism 1 as shown in FIG. 2, is operationally combined with and mounted to the lower frame 5. Wheel mechanism 1 has a slide block 11, a wheel rod base 12, a folding rod 13, a slide base 14, a connecting rod 15, an operating rod 16, a connecting plate 17, and two wheel rods 121 to be further described in following paragraphs.

The slide block 11 is rectangularly shaped to slidingly engage internal the cavity formed in frame 5 and be displaced in the lengthwise cavity formed in the lower frame 5. As shown in FIG. 2, the slide block 11 includes a recess 111 formed therein and a pair of spaced apart threaded holes 112 located within the recess 111. The recess 111 is positioned to allow the connecting plate 17 to be inserted therein and the connecting plate 17 also is located in the elongate opening 51 and is threaded with two screws 145 inserted in the holes 112. In this manner, the connecting plate 17 and the slide block 11 are combined and moved together after the slide block 11 is positioned within the hollow lengthwise cavity formed through lower frame 5.

The wheel rod base 12 connects a pair of inverted U-shaped plates fixedly secured in parallel relation around the upper portion of the lower frame 5 above the elongate opening 51 and pivotally connected with one end of the two wheel rods 121. The wheel rods 121 have the opposing or other ends fixed to a cart wheel 122. One of the wheel rods 121 has a hole 1211 formed at a predetermined location on its body for a bolt 132 and a nut 133 to extend through the hole 1211 and correspondingly hole 131 formed through one end of the folding rod 13.

The folding rod 13 has a hole 134 formed on one end for alignment with hole 1411 formed in a positioning member 141 extending in an inclined manner under the slide base 14. Bolt 142 and a nut 143 secure the folding rod 13 to the positioning member 141.

The slide base 14 has two projecting opposing parallel sections 146 having two holes 1461. The parallel sections 146 sandwich one end of connecting rod 15, and a bolt 152 and a nut 1531 secures the connecting rod 15 with the slide base 14. Bolt 152 passes through holes 1461 and 151.

The slide base 14 also includes a pair of holes 144 formed in a rear vertical side wall for insert therethrough of two screws 145 for threaded securement with the two threaded holes 112 subsequent to penetrating the holes 171 in the connecting plate 17. Thus, the slide base 14 and the slide block 11 are secured and are displaceable in a combined manner.

An L-shaped positioning plate 123 is provided to structurally connect operating rod 16 with one of the wheel rod bases 12. Plate 123 has formed therethrough hole 1231 to align with hole 161 in a lower end of operating rod 16 for a bolt 162 and a nut 1631 combination to couple the positioning plate 123 with operating rod 16. The positioning plate 123 is firmly fixed in a central portion of the wheel rod base 12.

The operating rod 16 has a hole 163 formed in a central portion to align with a hole 153 in connecting rod 15 for a bolt 164 and a nut 165 to pivotally couple the operating rod 16 to connecting rod 15. Actuating member 166 is thus firmly connected to an upper end of the operating rod 16.

Figure 6:
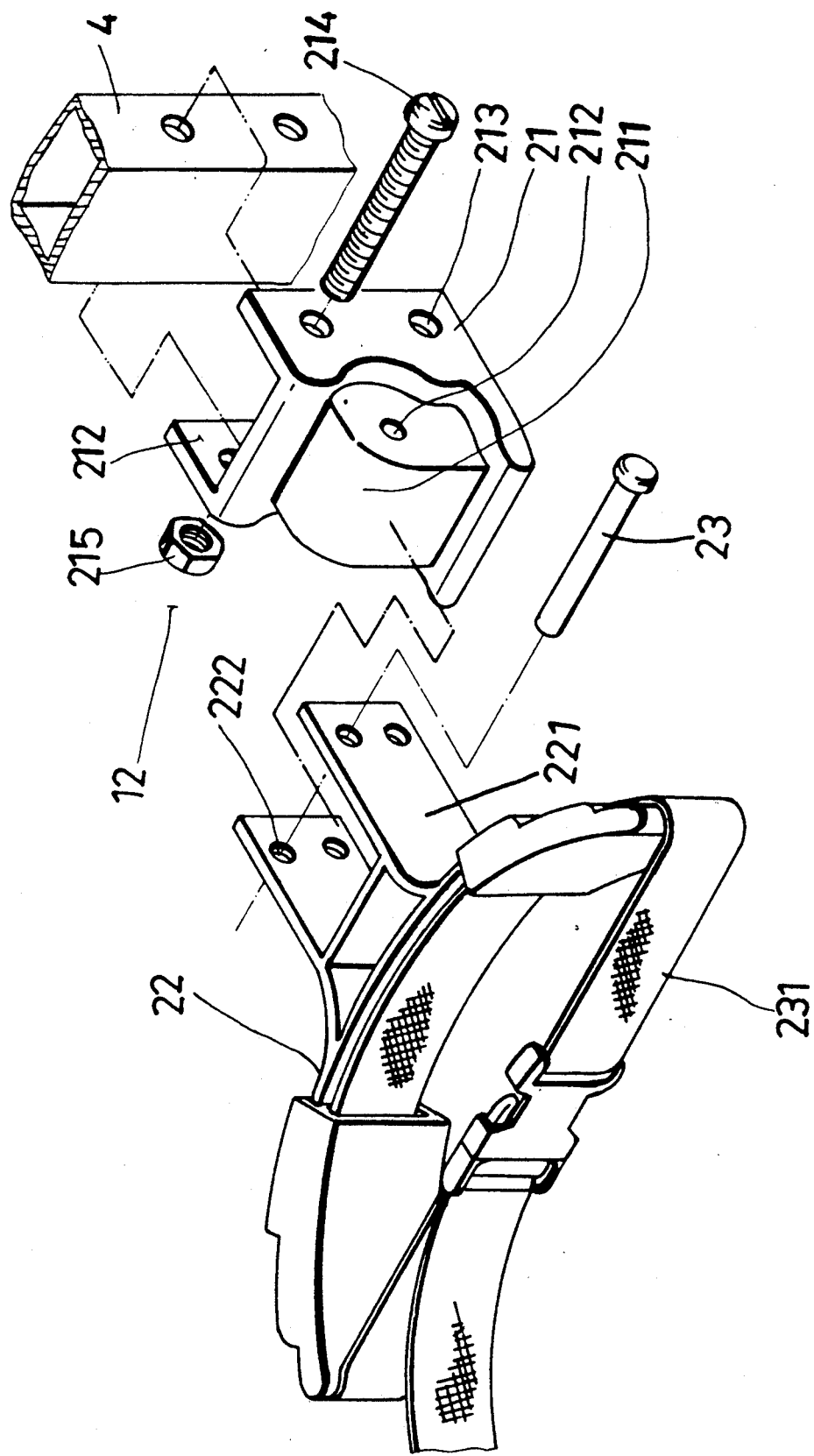
FIG. 6 is an exploded perspective view of the club bag strap in the collapsible three-stage golf cart of the present invention.
Figure 7:
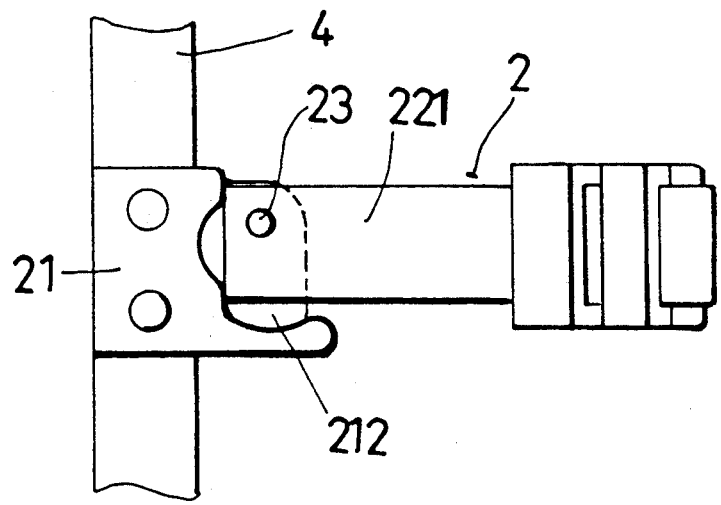
FIG. 7 is a side view of the club bag strap for use in the collapsible three-stage golf cart of the present invention; and, FIG. 8 is a side view of the club bag strap folded adjacent the intermediate frame for storage of the collapsible three-stage golf cart of the present invention.
Figure 8:
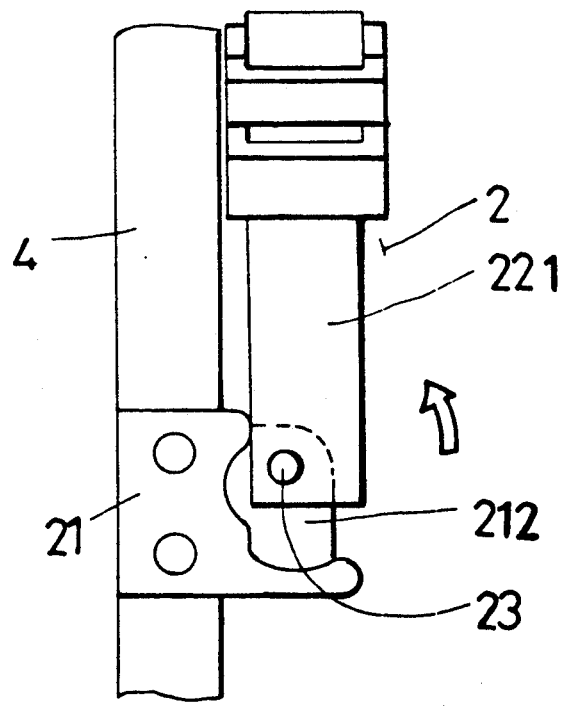

Club bag holder including a releasable strap 231, as shown in FIG. 6, has a connector 21 and a Y-shaped arm 22. Generally L-shaped connector 21 includes a projecting curved member 211 at a front portion and has an opening 212 defined by a pair of vertically directed parallel walls. Y-shaped arm 22 has a pair of vertically directed parallel walls 221 defining a rear section and holes 222 bored in the walls 221 for rivets 23 to pivotally secure the Y-shaped arm 22 with the connector 21 (FIGS. 7-8). The connector 21 includes holes 213 in two vertical walls for insert therethrough of bolts 214 and nuts 215 to secure the connector 21 with the intermediate frame 4.

Figure 3:
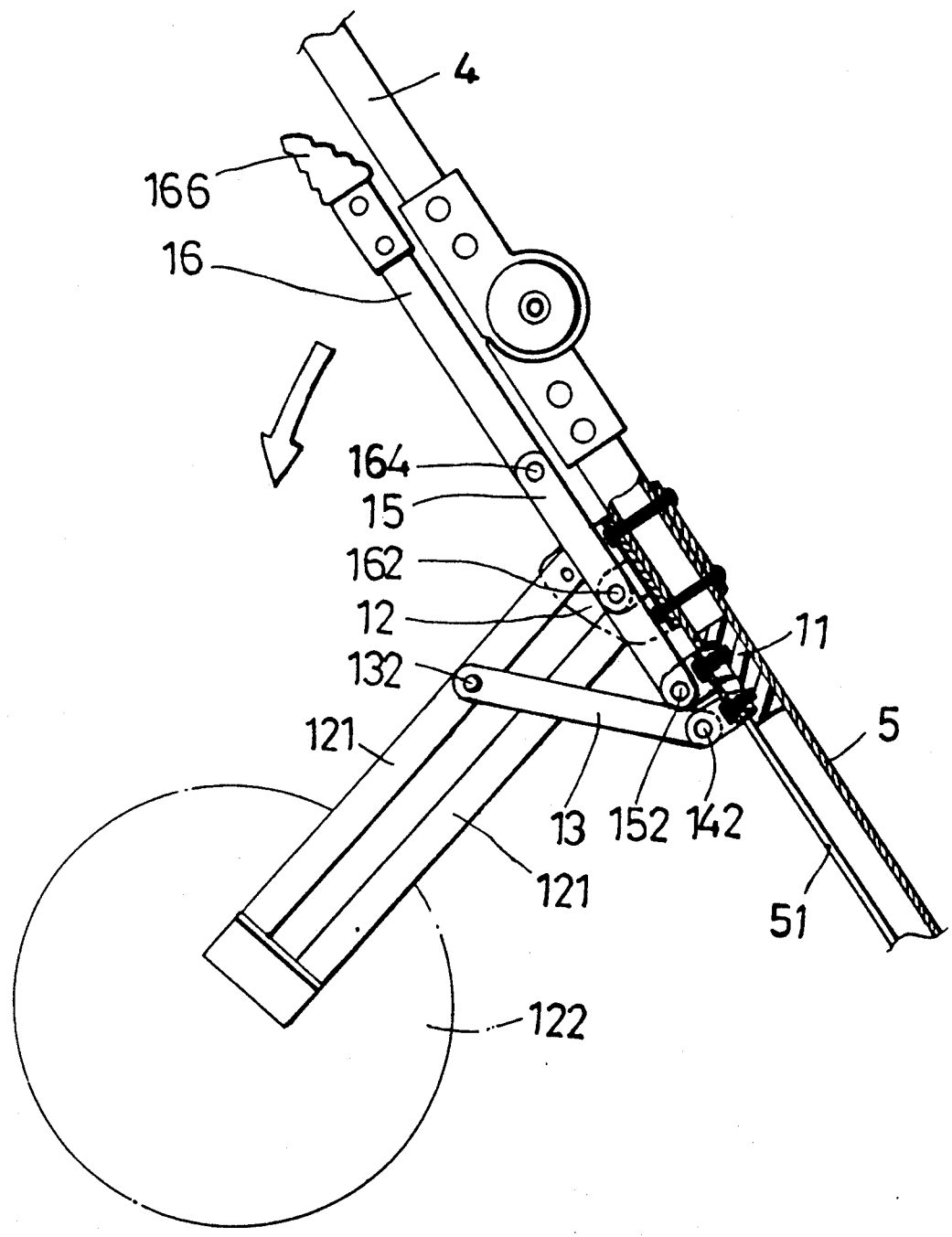
FIG. 3 is an elevational view partially cut-away of the collapsible wheel mechanism spread out for using the golf cart of the present invention.

The collapsible or foldable wheel mechanism 1 is to be used after being combined completely with the frame 5 as shown in FIG. 3 where the collapsible wheel mechanism 1 is in an unfolded wheel use position. The operating rod 16 may be pushed up to the intermediate frame 4 to be positioned adjacent the frame 4 allowing the connecting rod 15 to straighten to a position adjacent the frames 4 and 5. The wheel rods 121 are then displaced to a position approximating a right angle to the lower frame 5.

Figure 4:
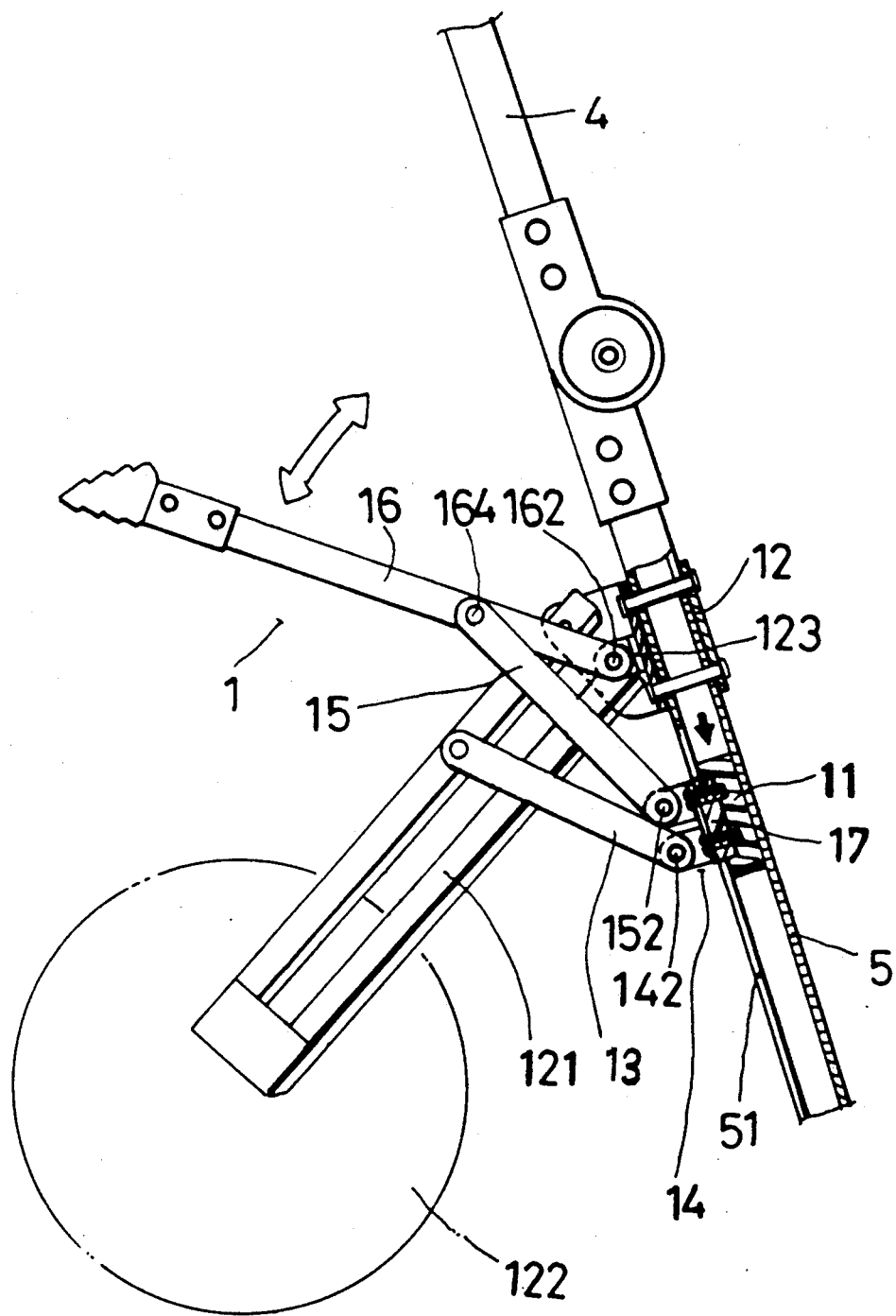
FIG. 4 is an elevational view partially cut-away of the collapsible wheel mechanism being partially collapsed for storage of the golf cart of the present invention.
Figure 5:
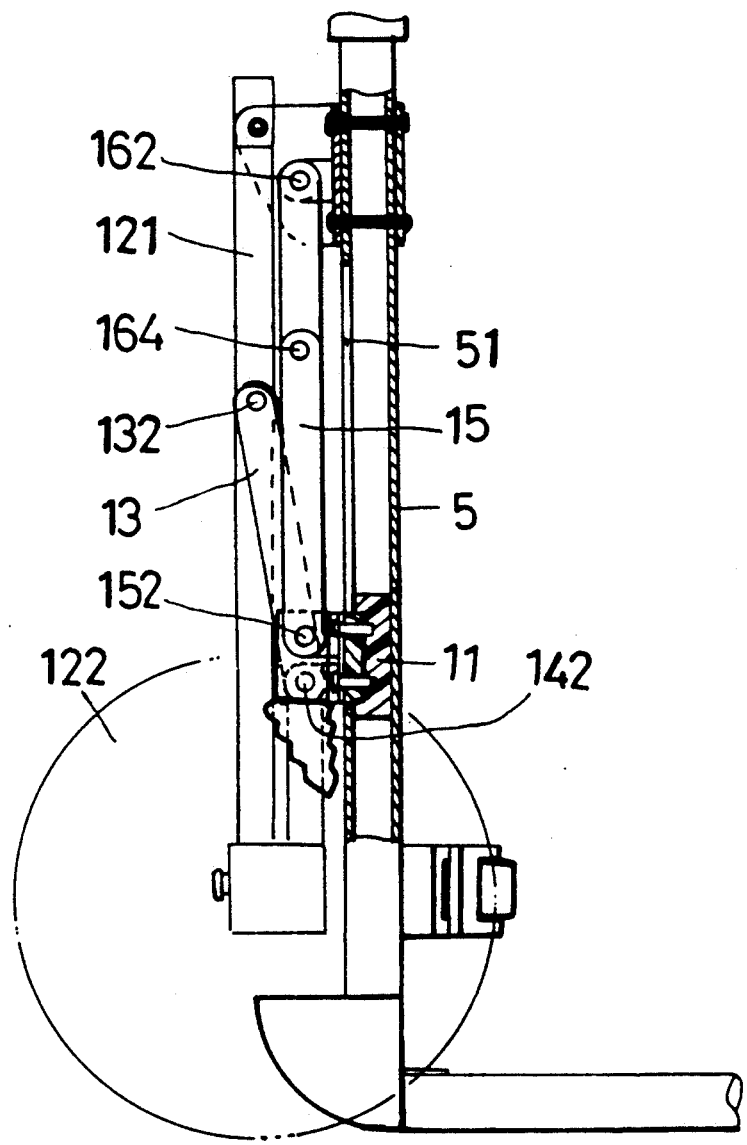
FIG. 5 is an elevational view of the collapsible wheel mechanism completely collapsed for storage of the golf cart of the present invention.

When the collapsible wheel mechanism 1 is to be collapsed or folded to a non-use position, the operating rod 16 is pulled downwardly as shown by the arrow marked in FIGS. 3 and 4 with the actuating member 166 displaced by the fingers. This allows the connecting rod 15 to push down the slide block 11 and allows the folding rods 13 to lessen their angle between the lower frame 5 and move to a substantially parallel position adjacent the intermediate and lower frame members as shown in FIG. 5.

When the golf cart is folded into a single stage, the Y-shaped arm 22 of the club bag holder may also be displaced adjacent frame 4 which minimizes the volume dimension of the golf cart.

What is claimed is:

1. A collapsible three-stage golf cart comprising:
   an upper frame having a grip handle formed on an upper end thereof, said upper frame being coupled to an intermediate frame at a lower end of said upper frame through a joint member coupling, said intermediate frame being displaceably coupled to said upper frame at an upper end of said intermediate frame with said intermediate frame being displaceably coupled to a lower frame through a joint member coupling, said lower frame formed of a hollow rod of substantially rectangular cross-section defining a longitudinally directed rectangular cavity passing therethrough to receive a slide block for slidable engagement therein and further including an elongate opening formed within one side of said lower frame for a connecting plate to be displaceably positioned therein;
   at least one collapsible wheel mechanism including an operating rod having a lower end pivotally connected to a positioning plate which is fixedly secured to a wheel rod base and an upper portion of said lower frame, an upper portion of said operating rod being connected to an actuating member;
   a pair of wheel rods having a pair of respective inner ends pivotally coupled to said wheel rod base and a pair of respective outer ends coupled to a wheel member for rotational interface with a base surface, one of said wheel rods having a central portion pivotally connected to a first end of a folding rod, said folding rod having a second end pivotally connected to a position member of a slide base slidably mounted on said lower frame;
   a connecting rod having one end pivotally connected to a central portion of said operating rod and an opposite end pivotally connected to a projecting portion of said slide base, said slide base further defining a rear vertical wall formed with two holes to receive a pair of screws to connect said slide base to said connecting plate and said slide block, said slide block having a rectangular contour and being slidingly engaged in the hollow longitudinal cavity of said lower frame, said slide block having a contoured recess formed in one side thereof and a pair of threaded holes located within the contour of said recess to receive a pair of threaded members to connect the slide block with said connecting plate and said slide base;
   a wheel rod base consisting of two inverted U-shaped plates bolted on the upper portion of the lower frame having said positioning plate firmly fixed at a central portion thereof and pivotally coupled to said operating rod and,
   said operating rod being manually displaceable to a position adjacent the intermediate frame resulting in the collapsible wheel mechanism to be extended for positional use of said golf cart and to a position adjacent the lower frame such that said operating rod, said connecting rod, said wheel rods, and said folding rod are displaced to a position contiguous to the the lower frame for minimizing the volume dimension of said golf cart for ease in transportation and storage.

2. The collapsible three-stage golf cart as recited in claim 1, including a club bag holder consisting of a Y-shaped arm having a releasable strap attached thereto and an L-shaped connector fixed on said intermediate frame for holding the upper portion of a club bag with said releasable strap said L-shaped connector bolted on a body of the intermediate frame and having a projecting, arcuately curved portion to be sandwiched between a pair of rear vertical parallel walls formed on said Y-shaped arm and pivotally riveted together with said curved portion.

* * * * *